United States Patent [19]
Wang et al.

[11] Patent Number: 5,958,989
[45] Date of Patent: *Sep. 28, 1999

[54] HIGHLY ASYMMETRIC ULTRAFILTRATION MEMBRANES

[75] Inventors: I-Fan Wang, San Diego; Jerome F. Ditter, Santa Ana; Richard A. Morris, Encinitas, all of Calif.; Robert Kesting, Sumner, Wash.

[73] Assignee: USF Filtration and Separations Group, Inc., Timonium, Md.

[ * ] Notice: This patent is subject to a terminal disclaimer.

[21] Appl. No.: 08/889,414

[22] Filed: Jul. 8, 1997

[51] Int. Cl.$^6$ .............................. C08J 9/28; B01D 39/00; B01D 39/14

[52] U.S. Cl. ...................... 521/64; 210/500.41; 521/180; 521/189

[58] Field of Search ......................... 210/500.41; 521/64, 521/180, 189

[56] References Cited

U.S. PATENT DOCUMENTS

| | | | |
|---|---|---|---|
| 4,481,260 | 11/1984 | Nohmi | 428/398 |
| 4,629,563 | 12/1986 | Wrasidlo | 210/500.34 |
| 4,774,039 | 9/1988 | Wrasidlo | 264/41 |
| B1 4,629,563 | 6/1997 | Wrasidlo | 210/500.34 |

FOREIGN PATENT DOCUMENTS

WO 96/02317  2/1996  WIPO .

*Primary Examiner*—Morton Foelak
*Attorney, Agent, or Firm*—Knobbe, Martens, Olson & Bear, LLP

[57] ABSTRACT

The present invention relates to highly asymmetric polymer membranes for ultrafiltration (UF), and to a simplified method of their manufacture. Disclosed herein are UF membranes with a high degree of asymmetry between the size of pores at the skin face of the membrane and the size of pores at the opposite face of the membrane. Asymmetry ratios of these membranes range from about 20 to about 1000. The porous support layer between the skin face and the opposite face is reticular and is substantially free of macrovoids. These membranes thus have higher flow rates than prior UF membranes. The membranes are cast from polymer dope mixes that are either homogeneous solutions or stable colloidal dispersions.

12 Claims, 1 Drawing Sheet

HIGHLY ASYMMETRIC ULTRAFILTRATION MEMBRANES

BACKGROUND OF THE INVENTION

1. Field of the Invention

The present invention relates to filtration membranes. More particularly, the invention relates to polymeric ultrafiltration membranes with enhanced flow rates, and to a simplified method of their manufacture.

2. Background of the Technology

Filtration membranes are useful for numerous applications wherein it is desirable to purify or separate components of gaseous or liquid mixtures. Membranes may be classified based in part on these uses. One classification scheme lists types of membranes functionally in increasing order of their size selectivity: gas separation (GS), reverse osmosis (RO), ultrafiltration (UF), and microfiltration (MF).

UF membranes typically are characterized as having a particular molecular weight cutoff or exclusion. For example, a membrane capable of retaining or excluding 90% or more of a macromolecule of 100,000 daltons could be classified as a 100K filter. Likewise, a membrane effective in efficiently excluding or retaining a macromolecule of 10,000 daltons may be referred to as a 10K filter. Of course, a 10K filter not only retains macromolecules having a MW of 10,000 daltons, but also generally retains any larger macromolecules in a heterogeneous solution with equal or greater efficiency. This fact accounts for the problem of membrane clogging that is inversely proportional to the size exclusion rating of the membrane—those membranes with a smaller exclusion limit retain more macromolecules in a heterogeneous mix, and tend to clog or foul more rapidly than membranes with a higher MW exclusion rating.

A particular challenge in the manufacture of UF membranes is to create a membrane with pores that are small enough to achieve an effective retention of macromolecules, while maintaining an acceptable flow rate of the fluid to be filtered. A membrane's resistance to fluid flow is a function of the diameter of the smallest, or retentive, pores through which the fluid must pass, and is also a function of the thickness of the layer of retentive pores. All other factors being equal, membranes whose limiting pores are situated in a relatively thin layer will have faster flow rates than membranes with a thicker layer of limiting pores.

In principle, an optimal membrane would have all of its limiting pores in one layer that is one molecule thick. Clearly, such a membrane would be practically impossible to manufacture or to handle after manufacture. This is especially true in the UF range and below (RO and GS ranges), because the membranes used in these applications often must structurally withstand relatively high pressures that are applied to accelerate the filtration process or to provide energy to overcome diffusion kinetics or osmotic forces. The different structural configurations of UF membranes, namely composite and integrally skinned membranes, represent practical attempts to approach the ideal of a very thin retentive layer.

Composite membranes have a relatively thin layer of retentive pores laminated to a support structure, which is often of a composition that is different from that of the retentive layer. The support structure stabilizes the retentive layer for ease of handling and is intended to offer very little resistance to fluid flux. Composite UF membranes are disclosed in PCT International Publication No. WO 96/02317. In this publication, some disadvantages of composite UF membranes are evident. For example, high filtration pressures can cause delamination of the composite and subsequent membrane failure. Additionally, many composites require at least a two stage manufacturing process to form sequentially the layers of which the composite is made.

The alternative to a composite membrane is an integral membrane. The term integral simply means that the membrane is all of one composition and is prepared in one casting process, although integral membranes may have structurally distinct regions or layers within the integral cross section. Integral UF membranes typically have a retentive skin in contact with a more porous support structure. In such a membrane, the main function of the support structure is to provide thickness to the membrane for ease of handling. In cross section, this kind of membrane displays a relatively dense skin at one surface, with an abrupt transition to a matrix of much larger pores in the support structure.

A disadvantage of this type of membrane, especially in the UF range, is that the support structure has numerous large voids known as macrovoids. These are finger-like projections in the support structure that generally do not communicate with the pores in the skin surface. Fluid entering a macrovoid is trapped and cannot be filtered. Macrovoids in a membrane therefore add to the membrane's resistance to fluid flow, leading to undesirably low flow rates without any concomitant benefit in effectiveness of filtration. Therefore, while a macrovoid-ridden support structure may provide mechanical stability to the skin, this configuration does not result in optimal UF membrane performance.

Skinned UF membranes are disclosed in U.S. Pat. No. 4,481,260 to Nohmi. The '260 patent is directed to hollow fiber membranes for UF applications. Hollow fiber membranes are commonly used for large-scale filtration operations wherein it is desirable to maximize the filter surface area for high total throughput. Typically, hollow fiber membranes must be spun from relatively viscous dope mixes with high concentrations of total solids. The structure of the Nohmi membranes is characterized by a skin layer with pore sizes effective for UF, adjacent to a support structure replete with macrovoids. Accordingly, the performance of these membranes is limited by the presence of macrovoids in the support structure. Also, the formulations of the Nohmi patent and other hollow fiber membrane disclosures are generally not appropriate for or applicable to flat sheet membranes, because of the higher dope viscosity and total solids required for the spinning of hollow fiber membranes as compared to formulations that may be suitable for casting flat sheet membranes.

Because the average pore diameter of the skin layer of a skinned membrane is so different from the average pore diameter of a macrovoid-containing support structure, such membranes have been called asymmetric, or anisotropic. This term is now often broadly applied to any membrane that has cross-sectional gradations in pore diameter, whether the gradations be abrupt or gradual. However, included among membranes that can be called asymmetric are very different structures that represent extremes of performance.

The highly asymmetric membrane structure pioneered by U.S. Pat. Nos. 4,629,563 (Reexamination Certificate No. B1 4,629,563, issued Jun. 3, 1997) and 4,774,039 to Wrasidlo, represents a vast improvement over the so-called asymmetric membranes that preceded it. This is because, in the MF range, the Wrasidlo membrane structure is free of macrovoids. Without macrovoids, the dead space within the membrane is significantly reduced if not eliminated, and flux rates are improved over prior MF membranes. In addition, the high degree of asymmetry within the support structure is gradual, rather than abrupt. This allows the support structure to act as a prefilter (or more accurately, as several prefilters of different sizes), and greatly enhances the life and dirt-holding capacity of the membrane by retaining particles that are much larger than the skin pores well before they enter the region of the skin layer.

The manufacture of the Wrasidlo MF membranes is based on the properties of an unstable dispersion of a membrane dope mix within the binodal or spinodal curves of a phase diagram. In this method, care must be taken with each casting to assure that the unstable dispersion is within the binodal or spinodal in order to achieve the desired membrane structure. The dope mix is typically under constant agitation prior to casting to prevent premature phase separation. Despite the prophetic UF membrane examples in the Wrasidlo patents, our diligent efforts to produce highly asymmetric, macrovoid-free UF membranes from an unstable solution have been unsuccessful. In membranes having skin porosities appropriate for UF applications, there have always been significant macrovoids present in the support structure, similar to the structures disclosed in the Nohmi patent.

Accordingly, it would be highly desirable to prepare UF membranes having a highly asymmetric structure analogous to the Wrasidlo membranes. Further, it would be beneficial to create such membranes by a method that does not require the careful and constant attenuation of a casting dope in an unstable dispersion. Such an advance would produce UF membranes with enhanced flow rates and dirt-holding capacity, and the manufacture of these membranes would be greatly simplified.

SUMMARY OF THE INVENTION

The present invention provides asymmetric integral polymer membranes for ultrafiltration. Structurally, these membranes include a skin face, an opposite face, and a porous support between the skin face and the opposite face. The skin face has numerous skin pores, that have a diameter of sufficient size to permit passage of a liquid therethrough while excluding passage of a macromolecule therethrough. The porous support consists of a substantially continuous reticular mass defining interconnecting flow channels communicating with the skin pores. The flow channels define support pores having diameters generally increasing gradually in size from the skin face to the opposite face, to an average diameter at the opposite face of at least about 20 times the diameter of the skin pores. The porous support is substantially free of voids materially larger in diameter than the gradually increasing support pores.

The membrane of this aspect of the invention may be cast as a flat sheet, from a homogeneous solution or a colloidal dispersion. The casting solution or dispersion contain a hydrophobic polymer, a solvent, and a nonsolvent. In preferred embodiments, the polymer is a sulfone polymer, such as, for example, polyethersulfone, polyarylsulfone, or polysulfone. The solvent may be selected from the group consisting of N-methylpyrrolidone, dimethylformamide, dimethylacetamide, dioxane, dimethylsulfoxide, chloroform, and tetrachloroethane. A preferred solvent is N-methylpyrrolidone. The nonsolvent may be selected from the group consisting of 2-methoxyethanol, propionic acid, t-amyl alcohol, methanol, ethanol, isopropanol, hexanol, heptanol, octanol, acetone, methylethylketone, methylisobutylketone, butyl ether, ethyl acetate amyl acetate, glycerol, diethyleneglycol, di(ethyleneglycol) diethylether, di(ethyleneglycol)dibutylether, and water, with propionic acid being preferred.

Membranes of the present invention may exclude macromolecules having a molecular weight of between about 150,000 and 300,000 daltons. In alternative embodiments, the membranes may have pore sizes adapted to exclude macromolecules of molecular weights from about 75,000 to 150,000 daltons. Other embodiments provide pore sizes capable of excluding macromolecules having a molecular weight between about 10,000 and 75,000 daltons. Still other membranes may exclude macromolecules having a molecular weight of less than about 10,000 daltons. Membranes of the invention may have skin pores with an average diameter of less than about 0.03 micron, and some may have skin pores with an average diameter of less than about 0.01 micron.

The membrane of this aspect of the invention may have a flow rate of water of at least 0.125 cm/(min×psi). In preferred embodiments, the membrane may have a normalized flow rate quotient ($\epsilon$) less than $12 \times 10^5$, based on the formula $\epsilon = e/v^2$, wherein (e) is a molecular weight exclusion value for the membrane in daltons, and wherein v is a flow rate of water of the membrane in cm/(min×psi).

A second aspect of the invention is a method of preparing an asymmetric integral polymer membrane for ultrafiltration, including the steps of: providing a casting dope including a hydrophobic polymer, a solvent, and a nonsolvent, in ratios sufficient to form a homogeneous solution or a colloidal dispersion; casting the dope to form a thin film; coagulating the thin film in a quench bath; and recovering an ultrafiltration membrane having an asymmetry ratio of at least about 20, the membrane being substantially free of macrovoids. This method may include the additional step of exposing the thin film to air for a preselected time. In some embodiments, the preselected time may be less than about one second.

The hydrophobic polymer used in the formulation may be between about 10 and 20 percent by weight of the casting dope. The nonsolvent may be between about 25 and 70 percent by weight of the casting dope. And the solvent may be between about 20 and 60 percent by weight of the casting dope. In some embodiments of the method, the hydrophobic polymer is a sulfone polymer, such as, for example, polyethersulfone, polyarylsulfone, or polysulfone. The solvent of the formulation may be selected from the group consisting of N-methylpyrrolidone, dimethylformamide, dimethylacetamide, dioxane, dimethylsulfoxide, chloroform, and tetrachloroethane, with a preferred solvent being N-methylpyrrolidone. The nonsolvent for this method may be selected from the group consisting of 2-methoxyethanol, propionic acid, t-amyl alcohol, methanol, ethanol, isopropanol, hexanol, heptanol, octanol, acetone, methylethylketone, methylisobutylketone, butyl ether, ethyl acetate amyl acetate, glycerol, diethyleneglycol, di(ethyleneglycol)diethylether, di(ethyleneglycol) dibutylether, and water, with propionic acid being preferred.

DETAILED DESCRIPTION OF THE PREFERRED EMBODIMENTS

Figure 1:
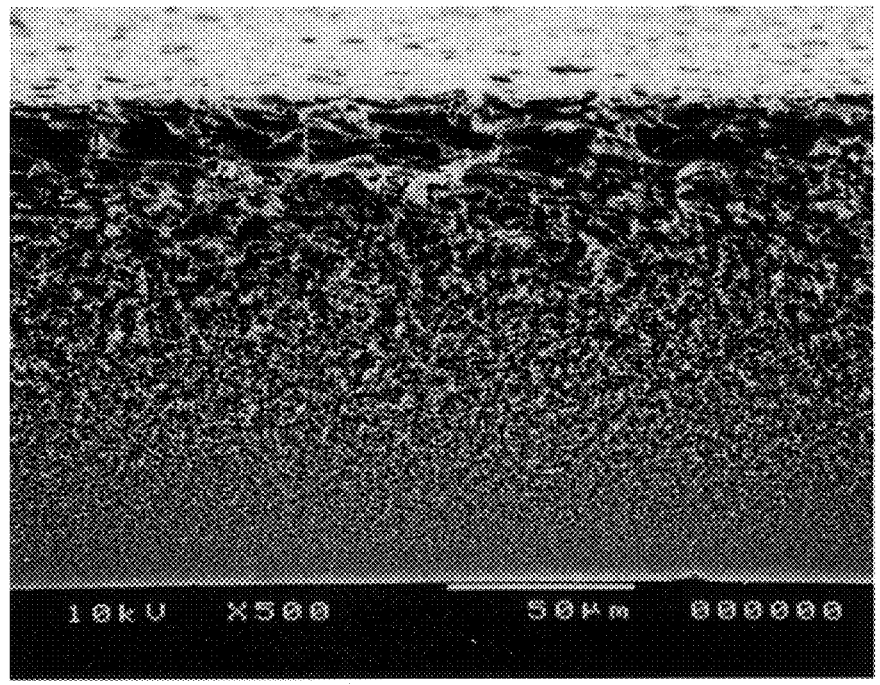
FIG. 1 is a cross-sectional view by scanning electron micrograph, at 500×magnification, of a 100K UF membrane according to the invention.

The present invention relates to a highly asymmetric UF membranes that are free of macrovoids, relatively easy to cast, and have enhanced flow rates over other commercially available UF membranes. In one embodiment, the highly asymmetric membranes may be made using sulfone polymers, such as polysulfone, polyarylsulfone, and polyethersulfone. These membranes are asymmetric, having a skin layer disposed adjacent to a reticular asymmetric support layer. The skin layer may have pores of sufficient diameter to allow passage of a liquid through the membrane while excluding macromolecules from passing therethrough. The membranes of the invention may be rated according to the lowest molecular weight macromolecules that they efficiently remove from a solution to be filtered. Accordingly, the invention contemplates numerous "MW cutoff" embodiments, including MW cutoffs of: between 150,000 and 300,000 daltons; between 75,000 and 150,000 daltons; between 10,000 and 75,000 daltons; and less than 10,000 daltons.

In addition, embodiments of the membrane can include a porous support comprising an asymmetric region of gradually increasing pore diameters such that the average diameter of the pores at the opposite face of the membrane may be from about 20 to about 1000 times the average diameter of the skin pores. The average diameter of pores at the opposite face, divided by the average diameter of pores at the skin face is the asymmetry ratio of the membrane. In preferred embodiments, membranes of the invention typically have asymmetry ratios of from about 30, 40, 50, or 100 to 300, 400, or 500.

Advantages of the Membranes of the Invention

One advantage of the membranes discussed herein is that they can be produced more efficiently than prior art membranes. It has been discovered that the membranes of the present invention can be produced with a simplified process that does not require employing an unstable or metastable casting dope. With a metastable casting dope such as described in the prior art, the membranes are normally produced with constant agitation prior to casting. In addition, special membrane film exposure conditions are often required following casting. Furthermore, it is sometimes necessary to provide other polymers in the casting solution or to include a heating step to induce the proper phase separation prior to the quenching step.

In one embodiment of the present invention, membranes are prepared by providing a casting dope comprising between about 10% and 20% by weight of a sulfone polymer, between about 20% and 60% by weight of a solvent and between about 25% and 70% by weight of a non-solvent. This casting dope is preferably a stable, clear, homogeneous solution or a stable colloidal dispersion. The casting dope is then cast to form a thin film and exposed to a gaseous environment, such as air, for between about 0 and 5 seconds. The thin film is then coagulated into a stable membrane by placing the thin film in a quench bath having a temperature between about 5° C. and 60° C.

Architecture of the Membranes

Figure 2:
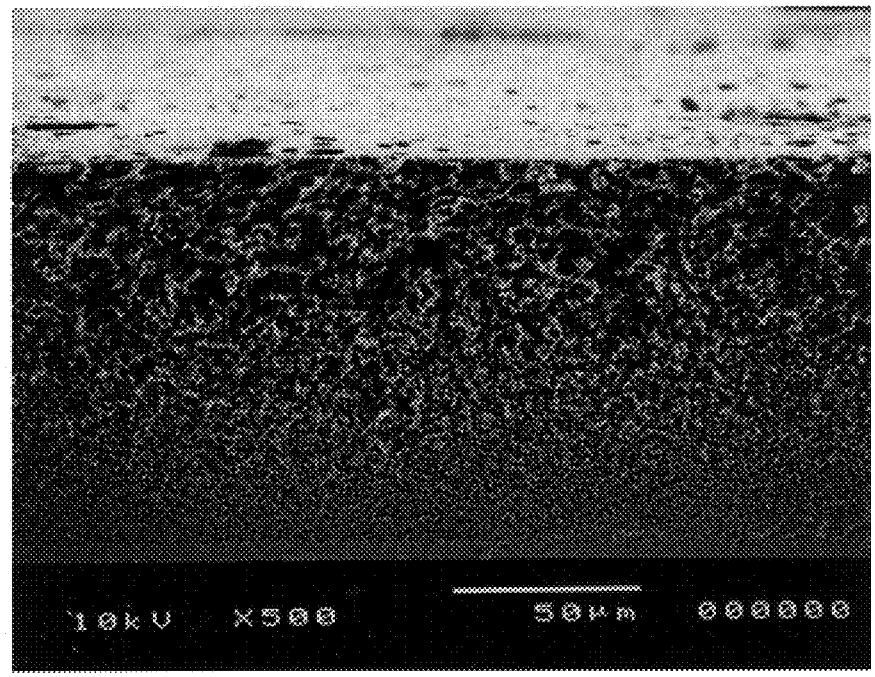
FIG. 2 is a cross-sectional view by scanning electron micrograph, at 500×magnification, of a 10K UF membrane according to the invention.

Embodiments of polymer membranes made by the methods disclosed herein have a skin face, a porous support, and an opposite face. The porous support has a reticular structure, rather than the granular structure seen in many prior UF membranes. The porous support has an asymmetric region of gradually increasing pore diameters. Because of the gradually increasing pore diameters in the porous support, and the relatively large pore diameters in the opposite face of the membranes of the invention, these membranes exhibit a substantial degree of asymmetry. A convenient method for assessing the asymmetry and pore diameter of membranes is through the use of scanning electron microscopy (SEM). FIGS. 1 and 2 are SEM micrographs illustrating the UF membranes of the invention in cross section. These figures demonstrate that the membranes of the present invention are highly asymmetric and are substantially free of macrovoids. This high degree of asymmetry and macrovoid-free morphology has not existed in prior UF membranes. Because of this significantly improved membrane structure, the membranes of the invention have flow rates that are superior to any commercially available UF membranes of similar MW cutoff ratings. The skin pores of the membranes may advantageously have an average diameter from about 0.003 micron to about 0.03 micron.

"Asymmetric structure," as used herein, refers to a membrane having a degree of asymmetry between the skin pore diameter and the pore diameter at the opposite face of the membrane that is about 10:1 or greater. In that regard, the membranes of the present invention have average skin pore diameters of about 0.003 $\mu$m or greater, while the pore diameter at the opposite face of the membrane may be typically at least about 20 times the average skin pore diameter. Thus, the ratio of microporous cast surface pore diameter to skin pore diameter is at least about 20:1 and in some embodiments is 100:1, or even 1000:1.

The membranes described herein are substantially free of macrovoids, which are voids that are materially larger in size than the gradually increasing pore diameters within the support structure. In addition, the membranes typically have a bulk porosity, or void volume, of greater than about 60%. The membranes of the present invention also have a substantially larger dirt-holding capacity in one flow direction than the other, due to the asymmetry of membrane. This enhanced dirt-holding capacity can greatly lengthen the life of a UF membrane, since any macromolecules or other particles significantly larger than the MW cutoff rating of the membrane will be retained within the reticular support layer, rather than reaching and clogging the minimum pores.

Some UF applications are optimized by orienting the membrane so that the retentive pores are upstream of the opposite face. Such an orientation is desirable, for example, in protein purification protocols, because the protein to be purified accumulates on the skin face and is easily eluted therefrom, rather than being trapped in the reticular support layer as would occur if the membrane were in the dirt-trapping orientation. In the "purification" orientation, of course, the dirt-holding capacity that is normally a benefit of highly asymmetric membranes is not realized, but the beneficial rapid fluid flux through the membrane still occurs, although the flow rate may diminish as molecules accumulate at the skin face.

Casting Solutions

As discussed above, polyethersulfone membranes can be prepared from stable, clear, homogeneous solutions as well as stable colloidal dispersions. Membranes are generally prepared from a casting dope or dispersion of a sulfone polymer along with a solvent and a nonsolvent. The concentration of the sulfone polymer in the casting dope should be low enough to form a substantially all-reticulated structure within the asymmetric support, but still high enough to produce a coherent membrane. If the polymer concentration is too low, the resulting membrane will have no coherency and, in the extreme case, only dust will be formed. If the polymer concentration is too high, then the membrane structure within the asymmetric support will not be substantially reticulated, but will contain at least some granulated structure.

Although the appropriate concentration of polymer varies somewhat depending upon the particular conditions used (e.g., solvents, nonsolvents, quench temperature), the polymer concentration should generally be from about 10% to about 20%. Typically, the casting dope contains from about 12% to about 18% polymer but preferably the casting dope includes about 13–17% polymer.

Several suitable polymers are available and can be used within embodiments of the invention. Other factors can combine with the kind and concentration of the polymer to affect the stability of the dope mix. Such factors include solvents or their mixtures, nonsolvents or their mixtures, and casting temperatures. The following are some of the materials which have been found useful in the practice of this invention, but it will be clear to those skilled in the art that many others and/or their combinations may also be used.

A particularly preferred polyethersulfone polymer for use in the presently claimed invention is E-6020P, manufactured by BASF Corporation, Mount Olive, N.J. Useful PES polymers are also is also available as Radel A-100, A-200, and A-300, manufactured by AMOCO PERFORMANCE PRODUCTS, Roswell, Ga. There is no particular molecular weight range limitation for polyethersulfone polymers which can be utilized. Another preferred polymer is polysulfone Udel-3500, also manufactured by AMOCO.

The preparation of membrane casting dopes wherein the casting dopes are stable, clear, homogeneous solutions or stable colloidal dispersions involves well-known principles of polymer solubility. Solvents for polymers may be categorized as "good" solvents, nonsolvents, and "poor" (or "ideal") solvents. "Good" solvents are those in which the interactions between the polymer molecules and solvent molecules are greater than the forces of attraction between one polymer molecule and another polymer molecule. The reverse is true for nonsolvents. "Ideal" or"poor" solvents are those in which the interactions between the polymer and solvent are equal to the forces of attraction between one polymer and another polymer molecule. Good solvents dissolve substantial amounts of polymer and may be miscible with the polymer, whereas poor solvents may or may not be miscible, depending upon the molecular weight of the polymer and how poor the solvents are.

It has been found that a stable, clear, homogeneous solution or stable colloidal dispersion can be obtained by first dissolving the polymer in a good solvent such as N-methylpyrrolidone or dimethylformamide, followed by addition titration just prior to or up to first turbidity of the solution with an appropriate amount of nonsolvent such as 2-methoxyethanol or propionic acid. The casting dopes are either clear, or if dispersions, have an optical density of less than about 0.5 at 420 nm with a 2 centimeter light path. Preferably, the casting dopes are clear, homogeneous solutions.

The solution or dispersion of polymers in the casting dopes useful in the present invention are in a stable liquid or colloidal dispersion condition. According to the present invention, this means that the stable liquid or colloidal dispersion will not normally separate into two or more distinct liquid phases for a period of at least one or more days at room temperature. The casting dopes of the present invention are often stable for several weeks to a month or more at room temperature, especially those containing 2-methoxyethanol as a nonsolvent. Non-limiting examples of solvents that may be used to produce membranes according to this invention include: N-methylpyrrolidone, dimethylformamide, dimethylacetamide, dioxane, dimethylsulfoxide, chloroform, and tetrachloroethane.

Among the preferred solvents are N-methylpyrrolidone and dimethylformamide. The amount of solvent which may be employed to prepare an asymmetric polyethersulfone membrane is between about 20% and about 60% by weight of the casting dope. Preferably, the amount of solvent used is between about 25% and about 50% by weight of the casting dope. Most preferably, the precise amount of solvent to be used is determined by the particular casting dope, including particular polymer, nonsolvent and the other conditions of the method of preparation of the particular membrane of interest.

Non-limiting examples of suitable nonsolvents include: 2-methoxyethanol, propionic acid, t-amyl alcohol, methanol, ethanol, isopropanol, hexanol, heptanol, octanol, acetone, methylethylketone, methylisobutylketone, butyl ether, ethyl acetate amyl acetate, glycerol, diethyleneglycol, di(ethyleneglycol)diethylether, di(ethyleneglycol) dibutylether, and water. Exemplary nonsolvents are 2-methoxyethanol and propionic acid. The amount of nonsolvent which may be employed to prepare an asymmetric polyethersulfone membrane is between about 25% and about 70% by weight of the casting dope. Preferably, the amount of nonsolvent used is between about 35% and about 60% by weight of the casting dope. Most preferably, the precise amount of nonsolvent to be used is determined by the particular casting dope, including particular polymer, solvent and the other conditions of the method of preparation of the particular membrane of interest.

In addition to the requirement of a stable polymer-solvent-nonsolvent casting dope, the relationship of these components to the quench liquid is also important. The polymer must, of course, be insoluble in the quench liquid, and the solvent should be soluble in the quench liquid (and vice versa). In fact, it is also preferred that the solvent and quench liquid be completely miscible with each other under membrane formation conditions. Water is the generally preferred quench liquid for economic and environmental reasons. It is also preferred that the solvent have a low viscosity. If the solvent has a low viscosity and the solvent and quench liquid are completely soluble in one another, rapid diffusion of the quench liquid into the casting dope is assured.

The nonsolvent should have only limited solubility in the quench liquid. In making ultrafilters, it is preferred that the nonsolvent be substantially nonmiscible with the quench liquid. This limited solubility is believed to be effective in increasing the asymmetry of the resulting membrane.

The asymmetry of a porous membrane may be measured by the ratio of the average pore diameter of its two faces. As noted hereinabove, the asymmetry ratio for the membranes of this invention is from about 20 to about 10000.

Casting Processes

The simplified method of the present invention to prepare a UF asymmetric polymer membrane, as stated previously, comprises: providing a casting dope comprising between about 10% and 20% by weight of a sulfone polymer, between about 20% and 60% by weight of a solvent and between about 25% and 70% by weight of a non-solvent, wherein said casting dope is a stable, clear, homogeneous solution or stable colloidal dispersion; casting the dope to form a thin film; exposing the thin film to a gaseous environment, for between about 0, 0.5, or 1 second and 5 seconds; coagulating the film in a quench bath having a temperature between about 5° C. and 60° C.; and recovering the coagulated membrane.

The membranes of the invention can be cast using any conventional procedure wherein the casting solution or dispersion is spread in a layer onto a nonporous support from which the membrane later can be separated after quenching.

The membranes can be cast manually by being poured, cast, or spread by hand onto a casting surface followed by application of a quench liquid onto the casting surface. Alternatively, the membranes may be cast automatically by pouring or otherwise casting the dope mix onto a moving belt. A preferred moving belt support is polyethylene coated paper. In casting, particularly in automatic casting, mechanical spreaders can be used. Mechanical spreaders include spreading knives, a doctor blade, or spray/pressurized systems. A preferred spreading device is an extrusion die or slot coater, which comprises a chamber into which the casting formulation can be introduced and forced out under pressure through a narrow slot. Membranes may be cast by means of a doctor blade with a knife gap of typically about 10 to about 20 mils, preferably about 12 through about 18 mils, and more preferably about 14 mils (375 microns). The relationship between the knife gap at casting and the final thickness of the membrane is a function of the composition and temperature of the dope mix, the duration of exposure to humid air, the relative humidity of the air during exposure, the temperature of the quench bath and other factors. Membranes typically collapse upon gelling, losing from about 20% to about 80% of their thickness. Casting solution or dispersion temperatures of between about 15° C. and 35° C. are typically utilized.

The air exposure time is generally from about 0 seconds to about 5 seconds. In other words, an air exposure is often not necessary. Ultrafiltration membranes are typically produced with the method of the invention excluding an air exposure, or with a very brief air exposure. Increasing exposure time, over this range, tends to increase permeability of the resulting membrane.

Following casting and exposure to a gaseous environment, the cast dispersion or solution is quenched. In a preferred embodiment, quenching is accomplished by moving the cast membrane on a moving belt into the quenching liquid, such as a water bath. The quenching liquid is most commonly water for the reasons stated above. In the bath, the quench operation precipitates or coagulates the polymer and can produce a layer of minimum pores having the requisite pore diameters and a support region having the characteristic highly asymmetric structure. The resulting membrane is ordinarily washed free of entrained solvent and may be dried to expel additional increments of solvent, diluent, and quench liquid, and thus recover the membrane.

The temperature of the quench bath is an important parameter. In general, the warmer the quench, the more open will be the membrane. Generally, in the manufacture of membranes in accordance with the invention, a wide temperature range can be utilized in the quenching step, ranging from about 5° C. to about 60° C. Preferably, the quench liquid is water and the quenching temperature is between about 22° C. and about 45° C. The temperature of the quench bath appears to cause marked changes in the pore diameters of the skin of the membrane and also in its asymmetry. Where higher quench temperatures are utilized, the membranes may possess both larger skin pores and enhanced asymmetry. Conversely, where lower temperatures are utilized, smaller pores form and asymmetry can be reduced.

Membranes are recovered from the quench bath in the conventional manner involving physical removal, washing with deionized water and oven or air drying.

The membrane of the invention may be 75 to 225 microns thick, or more. Preferably, the thickness of the membrane is about 90 to 200 microns. More preferably, the membrane thickness is about 110 to 150 microns. Typical membrane thicknesses of the present invention are 110 to 175 microns.

It is well known that several parameters such as polymer solution viscosity, polymer solution flow rate from the casting knife, membrane support belt speed, environmental and quenching conditions, and the like, affect membrane thickness. These can all be adjusted empirically to achieve the desired membrane. There is no practical limit to the thickness that may be achieved using the formulation of the invention. Accordingly, preferred embodiments are determined by what is known to be most useful for present applications.

The overall properties for the asymmetric UF membranes of the present invention may also be varied by varying parameters, such as polymer concentration, solvent and nonsolvent nature and concentration, relative degree of homogeneity or stability of the casting dope solution, exposure time to a gaseous environment following casting, quenching liquid and temperature and other variables of the system such as casting process, casting knife gap, and the like. Thus, routine experimentation may be required to optimize properties for each particular system.

Separation Applications of the Membranes of the Invention

The membranes of the invention are useful for, and exceptionally efficient in, separation and testing applications. The membranes of the invention can be utilized in a variety of pharmaceutical applications, such as for pyrogen removal from fluids. The membranes of the invention are also efficient in a variety of biotechnology applications such as separation media and in bioreactors and analytical testing applications. Further, the membranes of the invention are highly effective in the filtration of water. A particularly useful application is the production of ultrapure water for the electronic industry.

The membranes of the present invention may be used with either the skin side or the support side of the membrane upstream with respect to fluid flow, depending on the application. In the skin-downstream orientation, the reticulated porous support serves as a built-in prefilter, greatly increasing the dirt-holding capacity of the membrane. The fluid encounters the largest pores first and later encounters pores having gradually decreasing size with the smallest pores-those in the skin-being encountered last. Hence larger particles are retained before they reach the skin and do not clog its pores. Thus, a graded filtration is obtained in which the particles are retained at various levels leaving many more pores available for flow than if they were all retained in one plane at the skin. If the membrane is not highly asymmetric this advantage does not exist since approximately the same amount of retained matter fouls both sides of the membrane because the pore diameters on both sides are approximately the same. In applications wherein it is desirable to purify or concentrate a macromolecule that is in a liquid sample, it is advantageous to place the membrane in the "skin-upstream" orientation, so that the macromolecule to be purified does not become trapped in the membrane.

The membranes of the present invention can be further post treated to improve their hydrophilicity and the resulting membranes can be utilized in food, pharmaceutical, biotechnology and water filtration applications as described above.

The following examples are provided by way of illustration only and are not intended as a limitation of the present invention, many variations of which are possible without departing from the spirit and scope thereof. All parts and percentages in the examples and claims are by weight unless otherwise specified.

EXAMPLES 1–8

In each of the following examples, a membrane dope mix was prepared using a sulfone polymer, a nonsolvent, and a solvent. For Examples 1–8, the sulfone polymer was polyethersulfone E-6020P, Radel A-100, Radel A-200, or Radel A-300 (all PES); or posulfone Udell-3500 (PSU). Nonsolvents were propionic acid (PA) or 2-methoxyethanol (2-ME). The solvent for these Examples was N-methylpyrrolidone (NMP). Membrane samples were cast onto a moving belt of polyethylene coated paper using a casting knife with a knife gap of 14 or 17 mils. Following casting, the membranes were exposed to air for less than a second and were quenched in a water bath at a temperature specified for each Example.

After coagulation, the membranes were washed with deionized water and then air dried. The recovered membranes had thicknesses of 110–175 microns. Each membrane was tested for water permeability and protein retention at 10 psig and/or 55 psig on a 25 mm diameter disk Amicon stirred cell, which exposes approximately 3.8 cm$^2$ of filter surface for testing. Also, each membrane of Examples 1–8 was visualized in cross section via SEM, and each micrograph showed a highly asymmetric structure similar to those depicted in FIGS. 1 and 2. In addition, each membrane tested was assigned an approximate MW cutoff value based on retention efficiency (R %) of protein standards having known molecular weights. Protein standards were immunoglobulin G (IgG, MW=160,000); bovine serum albumin (BSA, MW=67,000); and chymotrypsin (Ctr, MW=24,000).

The results of Examples 1–8 are listed below in Table 1.

factors being held constant, a higher polymer concentration leads to a membrane with smaller pores at the skin surface, which results in a membrane with a lower molecular weight cutoff value.

Choice of Nonsolvent

A comparison of Examples 1 and 2 is instructive as it regards the properties of different nonsolvents in preparation of membranes according to the invention. Both membranes were cast from dopes within the "stable" range, the dopes being either clear and homogeneous or stable colloidal dispersions. The membrane of Example 1 was cast from a dope mix containing 40.6% PA, while the membrane of Example 2 was cast from a dope mix containing 57% 2-ME. It is evident from these examples that the concentrations of components in the dope mix may vary significantly, depending on which nonsolvent and/or solvent are selected. However, because of the clear distinction between a stable and an unstable dope mix, it is within the ability of a person of ordinary skill in the art, guided by this disclosure, to select a desired polymer concentration and then determine proper ratios for the appropriate solvent and nonsolvent, to achieve a stable dope mix that is either a clear, homogeneous solution or a colloidal dispersion.

Quench Temperature

As mentioned above, the quench temperature has a significant effect on the morphology of the membrane. A comparison of the membranes of Examples 1 and 3 is instructive. Both membranes were cast from dope mixes that

TABLE 1

|   | Polymer | Non-solvent | Solvent | Quench Temp | Flow Rate (ml/min) | Pressure (psi) | IgG R % | BSA R % | Ctr R % | MW Cutoff (daltons) |
|---|---------|-------------|---------|-------------|--------------------|----------------|---------|---------|---------|---------------------|
| 1 | PES 13.3% | PA 40.6% | NMP 46.1% | 25° C. | 25 | 10 | 96.4 | — | — | 100K |
| 2 | PES 15% | 2-ME 57% | NMP 28% | 45° C. | 15 | 10 | 90.3 | — | — | 100K |
| 3 | PSU 13.8% | PA 39% | NMP 47.2% | 45° C. | 21 | 10 | 75 | — | — | 200K |
| 4 | PES 15% | PA 36.4% | NMP 48.6% | 22° C. | 6.3 | 10 | 99.7 | 89.4 | 41 | 30K |
| 5 | PES 15% | PA 38% | NMP 47% | 25° C. | 5 | 10 | 96 | 90.2 | 10K |  |
| 5 | PES 15% | PA 38% | NMP 47% | 25° C. | 40 | 55 | 97 | 90 | 46 | 10K |
| 6 | PES 17% | PA 35.5% | NMP 47.5% | 25° C. | 2.4 | 55 | 99.9 | 94 | 90 | <10K |
| 7 | PES 15% | PA 36% | NMP 49% | 27° C. | 37 | 10 | 99.9 | 99.3 | 75 | 10K |
| 8 | PES 15% | PA 38% | NMP 47% | 27° C. |  | 10 |  |  |  | 10K |
| 8 | PES 15% | PA 38% | NMP 47% | 27° C. |  | 55 |  |  |  | 10K |

Examples 1–8 demonstrate that the properties of the membranes of the invention are dependent on the interactions of several factors, including the type and concentration of the polymer, nonsolvent, and solvent. The quench temperature is also important to the final properties of the membrane.

Effect of Polymer Concentration

Of the membranes whose properties are listed in Table 1, Example 1, having a MW cutoff of 100K has the lowest polymer concentration, while Example 6, having a MW cutoff of <10K has the highest concentration of polymer. Both membranes were quenched at the same temperature. Although the concentrations of solvent and nonsolvent are not identical for these two membranes, a comparison of Examples 1 and 6 support the general principle that, other had identical components and similar formulation ratios of polymer, nonsolvent, and solvent. The most marked difference in the way these membranes were prepared is in the quench temperature, which was 25° C. for Example 1 (MW cutoff=100K) and 45° C. for Example 3 (MW cutoff =200K). This comparison is consistent with the general rule that, other factors being held constant, a higher quench temperature results in more open pores, and a larger MW cutoff value.

Flow Rates

The Examples listed in Table 1 demonstrate the high flow rates of the membranes of the present invention. It is evident that membranes with larger limiting pores, and higher MW cutoff values, have a higher flow rate than membranes with more restrictive pore sizes. Based on the protein retention data, the membrane of Example 6 is classified as having a MW cutoff of less than 10K. Its relatively low flow rate is consistent with the data that indicate that this membrane has smaller limiting pores than the other membranes of Table 1.

By way of comparison, the membranes of the Nohmi patent, which patent purports to have superior flow rates over its prior art, have flow rates that are much less than those of the present invention. For example, of the several 95K membranes disclosed in the Nohmi patent, the one with the highest flow rate was Nohmi's Example 20, with a flow rate of 33 cubic meters per day per square meter of membrane area, at one atmosphere of pressure. This converts to a flow rate of 0.153 centimeters per minute per psi. The flow rates of Examples 1 and 2, both 100K membranes, likewise converted to the same units, are 0.658 and 0.395 respectively. Although some of this difference arguably could be attributed to differences in MW cutoff classification criteria, even the much more selective 30K membrane of the present invention (Example 4) has a higher flow rate than the best 95K Nohmi membrane.

Similar comparisons give similar results across all MW cutoff ranges between the Nohmi patent and the membranes of the present invention. Likewise, our comparison of flow rates with other commercially available flat sheet UF membranes shows that the membranes of the present invention have much faster flow rates than other UF membranes of similar MW retention grades. The improved flow rates of the present invention are believed to be due to the highly asymmetric structure of the membranes, and to the absence of macrovoids in these membranes.

Flow rates of UF membranes having different MW cutoffs can be normalized for comparison purposes using the formula $\epsilon = e/v^2$, where e is the normalized flow rate quotient, e is the MW exclusion value in daltons, and v is the flow rate in cm/(min×psi). By this formula, UF membranes of different MW cutoffs can be compared with respect to flow rates. We have found that the membranes of the invention consistently give $\epsilon$ values less than $12 \times 10^5$, while other membranes we have tested are well above that value. Low $\epsilon$ values are indicative of high normalized flow rates.

EQUIVALENTS

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. A method of preparing an asymmetric integral polymer membrane for ultrafiltration, comprising the steps of:

providing a casting dope comprising a sulfone polymer, a solvent, and a nonsolvent, in ratios sufficient to form a homogeneous solution or a colloidal dispersion;

casting said dope to form a thin film;

coagulating said thin film in a quench bath; and recovering an ultrafiltration membrane having an asymmetry ratio of at least about 20, said membrane being substantially free of macrovoids.

2. The method of claim 1, comprising the additional step of exposing said thin film to air for a preselected time.

3. The method of claim 1, wherein said preselected time is less than about one second.

4. The method of claim 1, wherein said hydrophobic polymer is between about 10 and 20 percent by weight of said casting dope.

5. The method of claim 1, wherein said nonsolvent is between about 25 and 70 percent by weight of said casting dope.

6. The method of claim 1, wherein said solvent is between about 20 and 60 percent by weight of said casting dope.

7. The method of claim 1, wherein said sulfone polymer is polyarylsulfone or polysulfone.

8. The method of claim 1, wherein said sulfone polymer is polyethersulfone.

9. The method of claim 1, wherein said solvent is selected from the group consisting of N-methylpyrrolidone, dimethylformamide, dimethylacetamide, dioxane, dimethylsulfoxide, chloroform, and tetrachloroethane.

10. The method of claim 9, wherein said solvent is N-methylpyrrolidone.

11. The method of claim 1, wherein said nonsolvent is selected from the group consisting of 2-methoxyethanol, propionic acid, t-amyl alcohol, methanol, ethanol, isopropanol, hexanol, heptanol, octanol, acetone, methylethylketone, methylisobutylketone, butyl ether, ethyl acetate amyl acetate, glycerol, diethyleneglycol, di(ethyleneglycol)diethylether, di(ethyleneglycol) dibutylether, and water.

12. The method of claim 11, wherein said nonsolvent is propionic acid.

* * * * *